(12) United States Patent
Kim

(10) Patent No.: US 8,046,302 B2
(45) Date of Patent: Oct. 25, 2011

(54) DIGITAL RIGHTS MANAGEMENT METHOD AND SYSTEM FOR CONTENT COPYRIGHT PROTECTION

(75) Inventor: Tae-sung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1344 days.

(21) Appl. No.: 11/050,757

(22) Filed: Feb. 7, 2005

(65) Prior Publication Data

US 2005/0177513 A1    Aug. 11, 2005

(30) Foreign Application Priority Data

Feb. 6, 2004   (KR) .................. 10-2004-0008067

(51) Int. Cl.
*G06F 21/00* (2006.01)
*G06F 21/22* (2006.01)
(52) U.S. Cl. ............ 705/51; 705/59; 705/901; 705/904; 705/908
(58) Field of Classification Search .............. 705/59, 705/51, 901, 904, 908; 713/200
See application file for complete search history.

(56) References Cited

U.S. PATENT DOCUMENTS

| | | | |
|---|---|---|---|
| 5,892,900 A * | 4/1999 | Ginter et al. ............ | 726/26 |
| 5,925,127 A | 7/1999 | Ahmad | |
| 7,134,144 B2 * | 11/2006 | McKune .................. | 726/26 |
| 7,430,670 B1 * | 9/2008 | Horning et al. ........... | 713/190 |
| 2002/0120465 A1 | 8/2002 | Mori et al. | |
| 2002/0169974 A1 | 11/2002 | McKune | |
| 2003/0004885 A1 | 1/2003 | Banerjee et al. | |

FOREIGN PATENT DOCUMENTS

| | | |
|---|---|---|
| CN | 1469670 A | 1/2004 |
| EP | 1 376 304 A2 | 1/2004 |
| EP | 1376304 A2 | 2/2004 |
| JP | 2000057057 A | 2/2000 |
| KR | 2002-0029657 A | 4/2002 |
| KR | 2002-0064672 A | 8/2002 |
| KR | 2002-0083851 A | 11/2002 |
| KR | 2003-0044892 A | 6/2003 |
| KR | 2003-0084798 A | 11/2003 |

OTHER PUBLICATIONS

Data Structures and Algorithm Analysis in C++, Weiss, Mark Allen. The Benjamin/Cummings Publishing Company, 1994. ISBN 0-8053-5443-3. Chapter 4 included; entire book cited.*
Introduction to Computer Science, Programming, Problem Solving, and Data Structures. Naps, Thomas et al. West Group, 1989. ISBN 0-314-48312-X. Pages from Chapter 18 included.*
Booch, Grady. Object Oriented Analysis and Design with Applications. Benjamin/Cummings Publishing Company, Redwood City, CA, 1994. Front matter, back matter, and pp. 54-59 included.*
Dale, Nell B., and Susan C. Lilly. Pascal Plus Data Structures, Algorithms, and Advanced Programming, $4^{th}$ edition. Lexington, MA: D.C. Heath, 1995. Front matter, chapter 8 (pp. 546-588) and chapter 9 (pp. 617-642) included.*

* cited by examiner

*Primary Examiner* — Andrew J. Fischer
*Assistant Examiner* — Christopher C Johns
(74) *Attorney, Agent, or Firm* — Sughrue Mion, PLLC

(57) ABSTRACT

A Digital Rights Management (DRM) method and system for content copyright protection protect right information on DRM content and effectively manage the right information. The DRM system for content copyright protection includes: a time security module for providing time change information when a user arbitrarily changes time; and a time security list management module for providing the right information on content and the time change information.

15 Claims, 6 Drawing Sheets

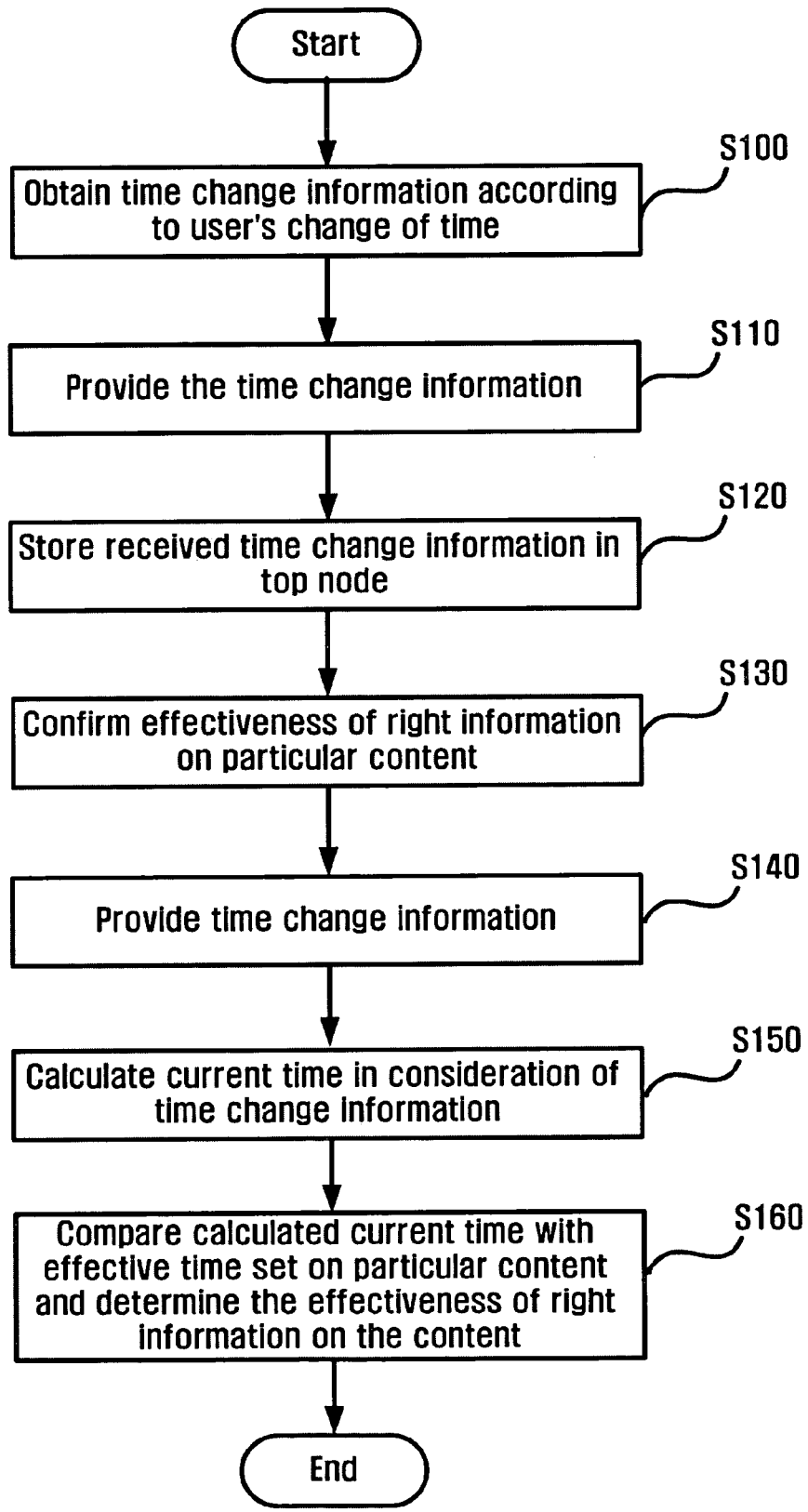

DIGITAL RIGHTS MANAGEMENT METHOD AND SYSTEM FOR CONTENT COPYRIGHT PROTECTION

CROSS-REFERENCE TO RELATED APPLICATION

This application claims priority from Korean Patent Application No. 10-2004-0008067 filed on Feb. 6, 2004 in the Korean Intellectual Property Office, the disclosure of which is incorporated herein in its entirety by reference.

BACKGROUND OF THE INVENTION

1. Field of the Invention

The present invention relates generally to a Digital Rights Management (DRM) method and system for content copyright protection, and more particularly to a DRM method and system for content copyright protection which can protect right information on DRM content and effectively manage the right information.

2. Description of the Prior Art

Recently, copyrights protection technologies, such as DRM, have been developed to protect the copyrights on digital content, including music, images and computer games, distributed through the Internet or digital broadcasting by restricting the number of reproductions, transfer and copying of the content.

FIG. 1 is a view showing time synchronization in a conventional Code Division Multiple Access (CDMA) network which includes a base station 10 for sending a pilot signal, devices (e.g., mobile stations) 21 and 22 for receiving the pilot signal from the base station 10 and consuming content, and a Global Positioning System (GPS) 30 for sending a standard time synchronous with a Universal Time Coordinated (UTC) to the base station 10. The pilot signal includes information necessary for time calculation in the devices 21 and 22.

In the conventional CDMA network, the base station 10 synchronizes time through the GPS 30. Also, the devices 21 and 22 acquire time information from a pilot signal received from the base station 10 and perform the time synchronization.

Even if the device 21 and 22 arbitrarily change the time, it is possible to prevent the change by obtaining the time information from the base station 10. In the CDMA network, the devices 21 and 22 can confirm the effectiveness of a right to legally use the content. The "right" refers to right-to-use information that specifies a right to reproduce the content.

However, in a Global System for Mobile communication (GSM) network that provides no time synchronization protocol, users of the devices 21 and 22 can arbitrarily change the time to illegally use DRM content.

The following solutions can be considered to solve the above problems.

A first solution is to mount a separate timer in a device (e.g., a mobile terminal) to prevent any arbitrary change of time. The timer mounted in the device can preserve a time period of use which has been preset in the right information on the DRM content.

However, the separate timer for checking the time period of actual use will be a burden to the user as an addition of hardware to the device.

A second solution is to synchronize the time using a standard Network Time Protocol (NTP).

For the communication between the conventional time synchronization protocol and the NTP, an on-line connection is needed, which will also be a burden to the user. The second solution cannot be used in places where on-line connections are not possible.

Korean Unexamined Patent Application No. 2002-064672, entitled "Content Usage Management System and Method", discloses a system and a method for managing the use of content by providing a license information processor that controls the use of the content according to right information transferred from a server to the user's device, which represents the user's right to use the content.

The disclosed techniques, however, do not solve the problems of the prior art requiring a separate on-line connection because the server should send a license ticket, which is an elementary unit constituting the user' right to use, to the user's device.

SUMMARY OF THE INVENTION

According to an aspect of the present invention, a method and a system are provided for protecting right information on DRM content from a user's arbitrary change of time, without any additional hardware or network connection.

According to another aspect of the present invention, a method and a system are provided for effectively managing right information changed upon a user's demand to change time.

In accordance with the above aspects of the present invention, there is provided a DRM system for content copyright protection, which includes: a time security module for providing time change information when a user arbitrarily changes time; and a time security list management module for providing right information on content and the time change information.

The time security list management module manages a list of the right information and the time change information according to content. The content, right information and time change information are managed in a tree structure.

The time change information is a value of difference between a predetermined standard time and a changed time. The top node in the tree structure relates to the time change information.

The time security list management module updates the list when any content or right is added or deleted.

In accordance with another aspect of the present invention, there is provided a DRM method comprising: providing time change information according to a user's arbitrary change of time; managing the received time change information and right information on content; and checking whether the right information is effective based on the time change information.

The right information and the time change information are listed and managed according to content. The content, right information and time change information are managed in a tree structure.

The time change information is a value of difference between a predetermined standard time and a changed time. The top node in the tree structure relates to the time change information. The effectiveness of the right information is determined based on the time change information and the current time.

The checking whether the right information is effective includes: calculating the actual current time in consideration of the time change information; comparing the calculated current time with an effective time set in the right information on the content; and determining whether the right information is effective.

The managing the right information and the time change information includes: generating a top node in a tree structure when new content is added; generating a node subordinate to the top node; and storing information on the new content.

The managing the right information and the time change information further includes: when new right information is added with respect to predetermined content, generating a new node subordinate to a corresponding content node; and storing the new right information in the newly generated subordinate node.

Also, the managing the right information and the time change information further includes: when any content or right information is deleted, searching for corresponding content node and right node and deleting the nodes.

BRIEF DESCRIPTION OF THE DRAWINGS

The above and other aspects of the present invention will be more apparent from the following detailed description taken in conjunction with the accompanying drawings, in which:

FIG. 7 is a flow chart showing a DRM method for content copyright protection according to the present invention.

DETAILED DESCRIPTION OF EXEMPLARY EMBODIMENTS OF THE PRESENT INVENTION

Figure 1:
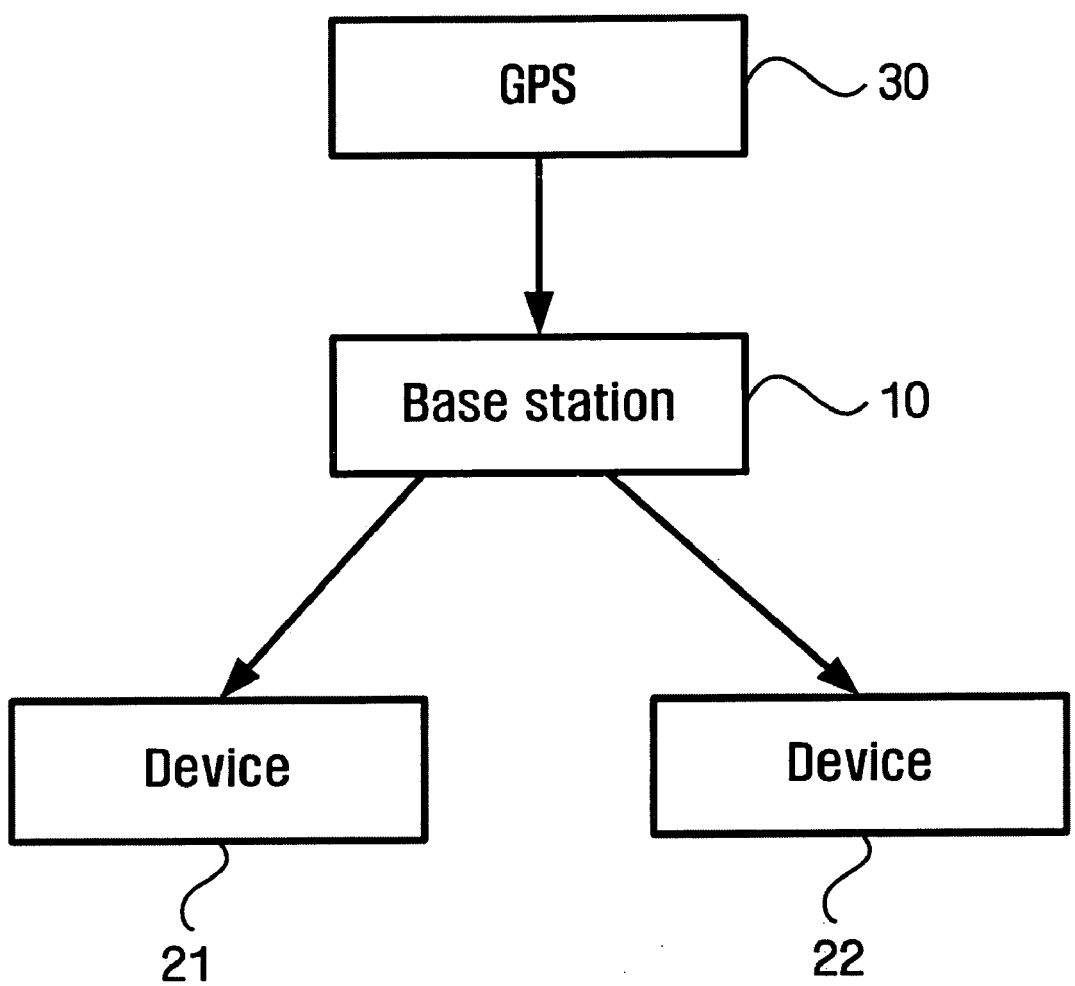
FIG. 1 is a view showing a time synchronization in a conventional code division multiple access network.

Hereinafter, exemplary embodiments of the present invention will be described with reference to the accompanying drawings. The matters defined in the description such as a detailed construction and elements are provided to assist in a comprehensive understanding of the invention. Thus, it is apparent that the present invention can be carried out without those defined matter. In the following description of the exemplary embodiments of the present invention, the same drawing reference numerals are used for the same elements even in different drawings. Also, a detailed description of known functions and configurations incorporated herein will be omitted when it may make the subject matter of the present invention rather unclear.

Figure 2:
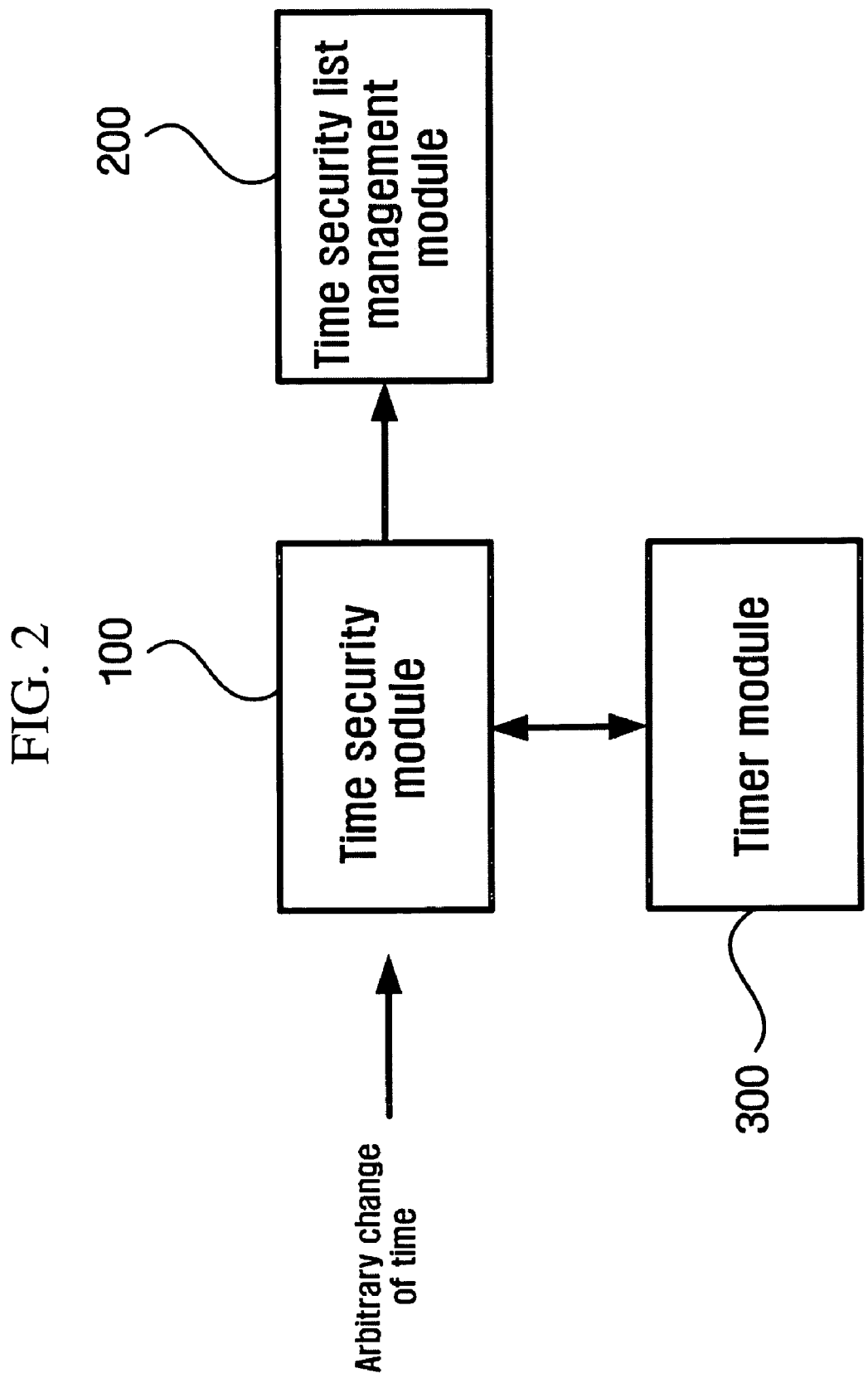
FIG. 2 is a block diagram schematically showing a DRM system for content copyright protection according to an exemplary embodiment of the present invention.

FIG. 2 is a block diagram schematically showing a DRM system for content copyright protection according to an exemplary embodiment of the present invention. The DRM system includes a time security module 100, a time security list management module 200 and a timer module 300. Any one of the time security module 100, the time security list management module 200 and the timer module 300 may be embodied on a computer.

The time security module 100 provides time change information according to the user's arbitrary change of time. In other words, when the user arbitrarily changes the time, the time security module 100 obtains a predetermined standard time (for example, a current time) from the timer module 300 and calculates the difference between the predetermined standard time and the arbitrarily changed time. The time security module 100 sends the calculated value of difference (i.e., time change information) to the time security list management module 200. The change of time is made by the user of a particular device or by applications within the device. The device has a DRM function to offer music, images and games.

The time security list management module 200 manages and provides right information on content and the time change information. The time security list management module 200 manages a list of the right information and the time change information according to the content. The content, right information and time change information are managed in a tree structure.

Also, the time security list management module 200 updates the right information and the time change information when any content or right information is newly added or deleted. In other words, the time security list management module 200 generates a new node upon addition of new content or right information and manages the new node. When any content or right information is deleted, the time security list management module 200 removes the corresponding content node or right node. The right information refers to right-to-use information that specifies a right to reproduce the content. For example, the right information defines how many times and for how many days or how many hours the content can be used.

The timer module 300 provides the current time of a device upon demand from the time security module 100.

Figure 3:
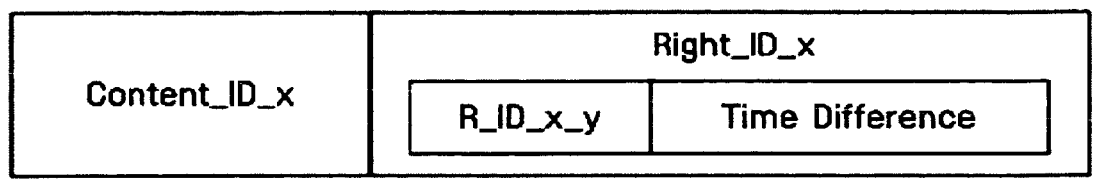
FIG. 3 is a view showing the structure of a list managed by a time security list management module according to an exemplary embodiment of the present invention.

FIG. 3 is a view showing the structure of a list managed by the time security list management module according to an exemplary embodiment of the present invention.

As shown in FIG. 3, the list includes right information and time change information on each content. To be specific, the list includes a content ID for identifying content, right information which is right-to-use information on the content and time change information.

According to an exemplary embodiment of the present invention, the list storing the right information and the time information can be protected through encryption, as well as through the time security list management module 200.

Figure 4:
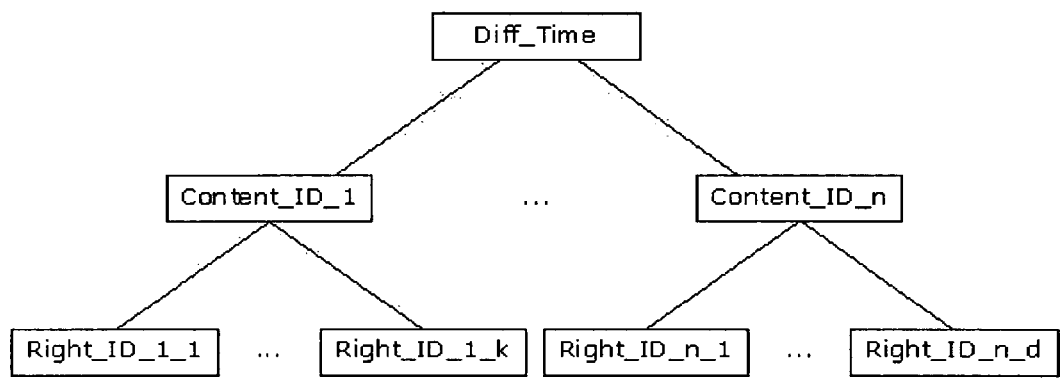
FIG. 4 is a view showing a tree structure of content, right information and time change information according to an exemplary embodiment of the present invention.

FIG. 4 is a view showing the tree structure of content, right information and time change information according to an exemplary embodiment of the present invention.

There may be various right information and time change information on a single content. Whenever time is changed on particular content, overall change of time in the information is needed, thereby causing the increase of load. Thus, an effective method for managing the list is sought.

A tree structure can be used to manage the list, reducing the load caused by the change of time.

For example, when the user arbitrarily changes time, time change information is stored in the top node of the tree. More specifically, the time changed upon the user's request is compared with the current time. The difference between the two times is calculated and recorded in the top node. When the time is further changed at a later time, only the time difference recorded in the top node will be changed. Since the overall change of time in the list is not needed, it is possible to reduce the load caused by the change of time.

In order to delete any right information or content information, the user has to delete only the node including the information to be deleted or the node including the right information connected to a branch of the content. Accordingly, the content and the right information can be effectively managed.

Figure 5:
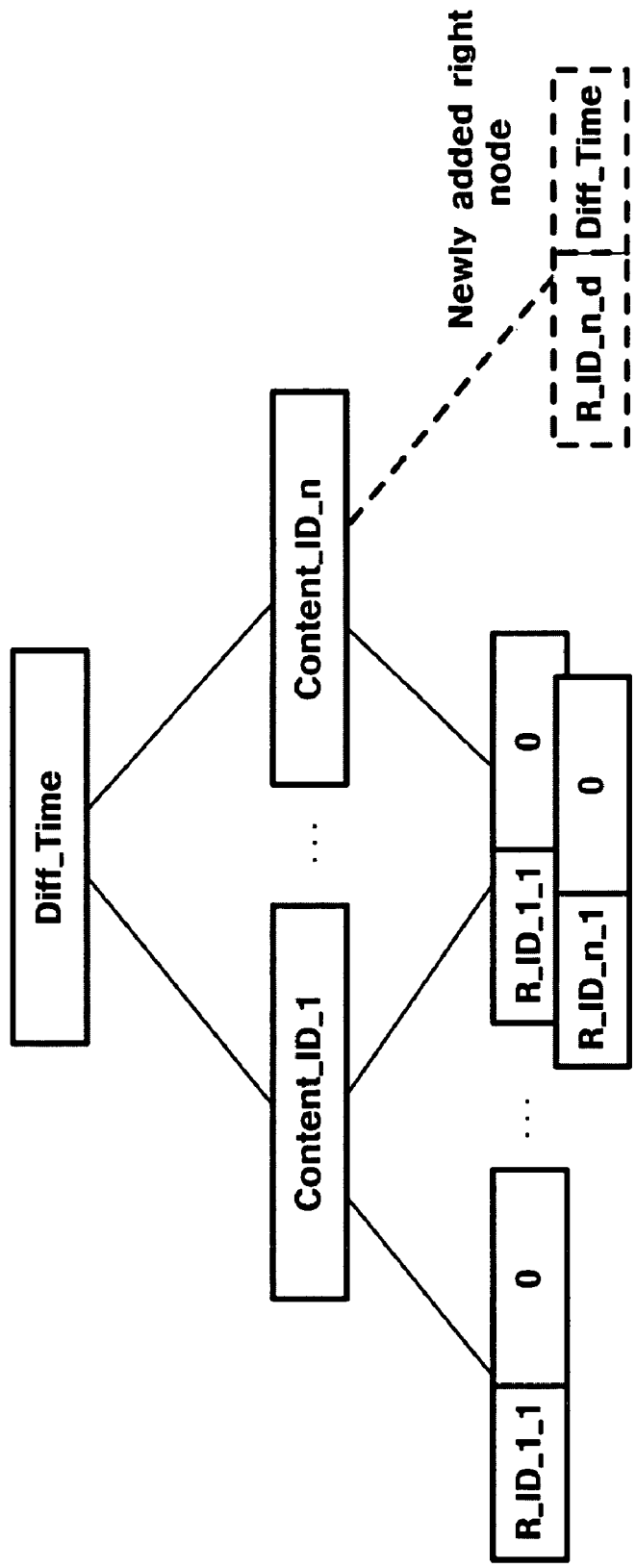
FIG. 5 is a view showing a process of adding a new right node according to am exemplary embodiment of the present invention.

FIG. 5 is a view showing a process of adding a new right node according to an exemplary embodiment of the present invention.

As shown in FIG. 5, when new right information is added with respect to existing content, a subordinate node is generated from the corresponding content node to add a new right node. At this time, time change information is stored with a negative code in the newly added right node. The current time calculated in consideration of the time change information will be compared with an effective time set in the newly added right node when determining the effectiveness of the right information corresponding to the newly added right node.

Supposing that the initial value of the top node is −2, that is, the sum of times that the user has changed up to date is −2, the value to be set on the newly added right node will be +2. Accordingly, the sum of times changed is 0((−2)+(+2)) in the newly downloaded right node, which signifies that an effective value of the newly added right node is equal to the time value set when downloaded to the original device. In other words, no time has been changed by the user after the downloading.

Figure 6:
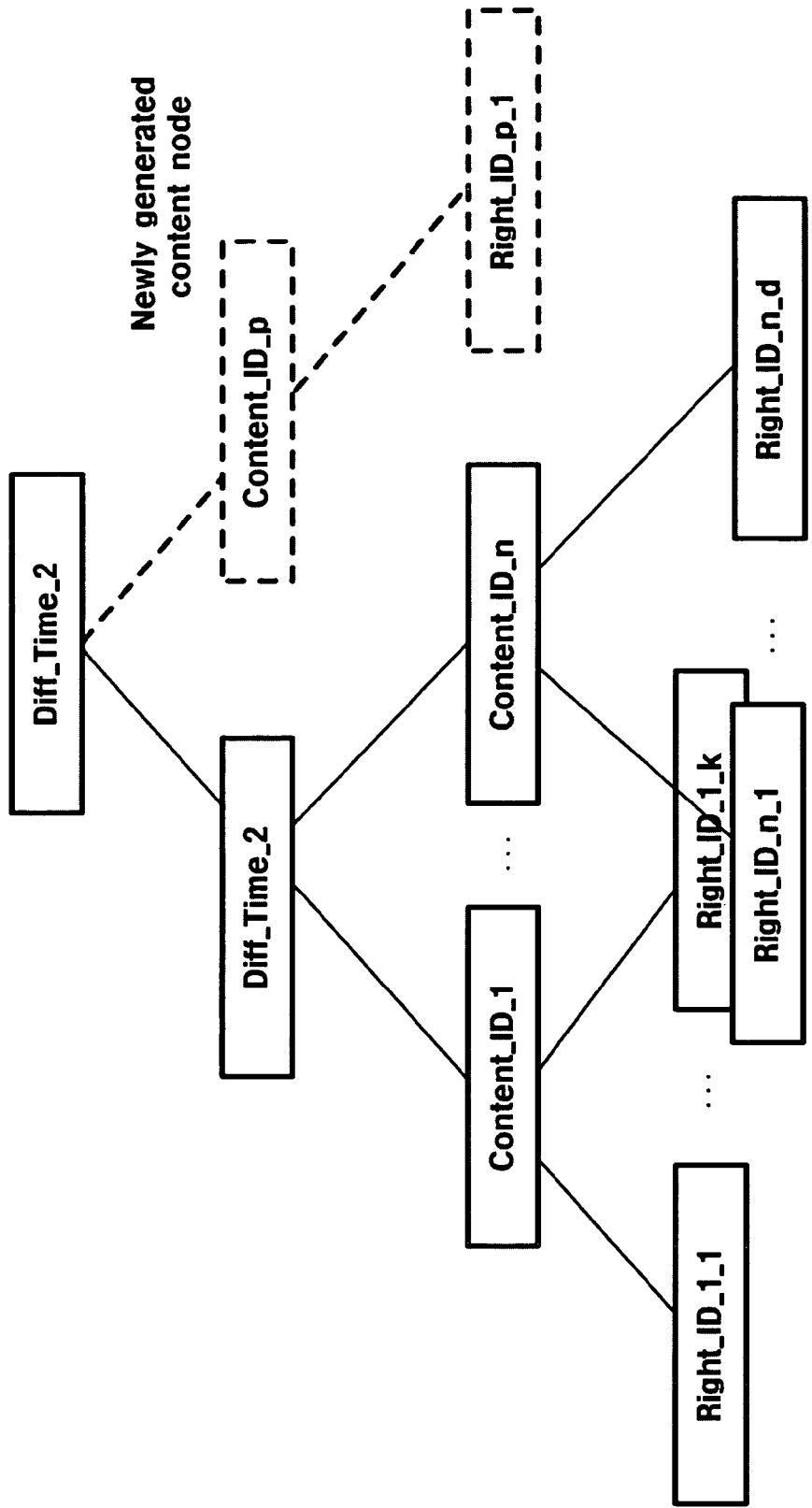
FIG. 6 is a view showing the structure of a list when new content and right are added according to an exemplary embodiment of the present invention.

FIG. 6 is a view showing the structure of a list when new content and right are added according to an exemplary embodiment of the present invention.

As shown in FIG. 6, when new content and corresponding right information are added, a node higher than the current top node is generated. The newly generated node will become the top node in the tree structure.

Subsequently, the value of the generated top node is initialized to zero. A content node is generated as a subordinate of the top node. Also, a right node having information on the newly generated content node is added.

If the right information is not effective or the user demands to remove the right information, a particular right node can be removed from the corresponding content node. In order to remove particular content itself, the content node should be removed, which will cause removal of all corresponding right nodes.

FIG. 7 is a flow chart showing a DRM method for content copyright protection according to an exemplary embodiment of the present invention.

When the user arbitrarily performs a time change on particular content through a device supporting content such as music, images or games, the time security module 100 requests the timer module 300 to provide the current time of the user's device. Then, the time security module 100 calculates the difference between the current time provided from the timer module 300 with the time changed by the user (S100).

The time security module 100 sends the calculated time difference to the time security list management module 200 (S110). The time security list management module 200 stores the received time difference (i.e., time change information) in the top node of the tree structure.

If the time security list management module 200 is requested to provide the time change information to determine the effectiveness of particular content in the user's device (S130), it will send the time change information stored in the top node (S140) and will calculated the actual current time in consideration of the time change information (S150).

Subsequently, an effective time set in the right information on the content is compared with the current time to determine whether the right information is effective (S160).

For example, it is assumed that the user has arbitrarily changed the current time at 13:00 to be two hours ahead (i.e. to 11:00 from 13:00).

If the user checks the current time four hours later in order to see the effectiveness of the right information on particular content in the device, the time displayed on the user's device will be 15:00.

If the time security list management module 200 is requested to provide time change information, it will send the time change information (two hours) stored in the top node. According to the time change information, two hours are added to the displayed time 15:00, thereby providing the actual current time, i.e. 17:00.

The effective time set in the right information on particular content (for example, 18:00) is compared with the actual current time (17:00) to determine the effectiveness of the right information. From the comparison (one hour difference), the right information is determined to be effective.

Accordingly, it is possible to protect a time period preset to legally use the right information on DRM content and effectively manage the content and the right information.

The DRM method and system for content copyright protection according to the present invention may produce the following advantageous effects.

First, whenever the user arbitrarily changes time in a device, the changed time is traced to prevent any illegal use of corresponding DRM content.

Second, time related rights can be safely protected without time synchronization with a server through an additional hardware or network connection, thereby reducing a burden of cost.

Third, since time change information is stored in the top node, it is possible to easily and effectively manage any time change by changing only the value in the top node.

Fourth, it is also possible to effectively manage newly added DRM content or right information.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A Digital Rights Management (DRM) system for content copyright protection, the DRM system comprising:
   a time security module which determines time change information when a user arbitrarily changes a standard time related to a selected content to a changed time as a value of a difference between a value of the standard time, prior to being changed by the user, and a value of the changed time; and
   a time security list management module which manages content, right to use information related to the content and the time change information based on a tree structure comprising:
      a top node which stores the time change information, and
      nodes subordinate to the top node, wherein the subordinate nodes store the right to use information with an effective time information which is set when the subordinate node for a respective right to use information is created,
   wherein the time security module calculates a current time based at least on a sum of the value of the time change information stored in the top node and the value of the changed time, the right to use information of the selected content stored in a corresponding subordinate node is checked by the DRM system to determine whether the right to use information is effective based on comparing the current time with the effective time, and when new content and corresponding right information are added, the time security list management module generates a new top node higher than a current top node which becomes the top node in the tree structure, and at least one of the time security module and the time security list management module is embodied on a computer.

2. The DRM system as claimed in claim 1, wherein the time security list management module manages a list of the right to use information and the time change information according to a respective content.

3. The DRM system as claimed in claim 1, wherein the time security list management module updates the tree if at least one of the content and a right-to-use a respective content is added or deleted.

4. A Digital Rights Management (DRM) method comprising:
determining time change information, by a time security module, according to an arbitrary change of a standard time related to a selected content, to a changed time, as a difference between a value of the standard time and a value of the changed time;
managing the time change information, content and right to use information related to the content in a tree structure by a time security list management module, comprising:
storing and managing the time change information in a top node of the tree structure, and
storing and managing the right to use information in right-to-use nodes subordinate to the top node, which each right-to-use node comprises an effective time for the stored right to use information that is set when a respective right-to-use node is created;
calculating a current time based on the value of the time change information stored in the top node and the value of the changed time; and
determining whether the right to use information of the selected content stored in a corresponding right-to-use node is effective based on comparing the current time with the effective time,
wherein when new content and corresponding right information are added, a new top node higher than a current top node is generated and becomes the top node in the tree structure, and
at least one of the time security module and the time security list management module is embodied in a computer.

5. The DRM method as claimed in claim 4, wherein the right to use information and the time change information are listed and managed according to the content.

6. The DRM method as claimed in claim 4, wherein the managing the right to use information and the time change information comprises:
generating a top node in a tree structure if new content is added;
generating a node subordinate to the top node; and
storing information on the new content.

7. The DRM method as claimed in claim 6, wherein the managing the right to use information and the time change information further comprises:
generating a new node subordinate to a corresponding content node if new right to use information is added with respect to predetermined content; and
storing the new right to use information in the new node.

8. The DRM method as claimed in claim 7, wherein the managing the right to use information and the time change information further comprises:
searching for corresponding content node and right-to-use node; and
deleting the corresponding node if at least one of the content and right to use information is deleted.

9. The system as claimed in claim 3, wherein the time security list management module deletes a respective subordinate node comprising one of the content and right to use information from the tree to delete a corresponding one of the content and a right to use the respective content.

10. The system as claimed in claim 3, wherein the time security list management module generates a node subordinate to the node comprising the selected content when a new right to use information is added for the selected content.

11. The system as claimed in claim 10, wherein the effective time information is set based on the change time information related to the selected content in a newly created node comprising the right to use information.

12. The system as claimed in claim 11, wherein the effective time information is offset to compensate for the stored change time information related to the selected content.

13. A method comprising:
storing a content in a content node of a tree structure by a time security list management module;
storing a right-to-use the content information in a right-to-use node of the tree structure by the time security list management module;
setting an effective time for the stored right-to-use content information in the right-to-use node by the time security list management module;
detecting an arbitrary time change related to the content by a time security module;
determining a first current time related to the content by the time security module;
determining a time change as a difference between the determined first current time and the detected arbitrary time change by the time security module;
storing the determined time change in a top node of the tree structure by the time security list management module, the content and right-to-use nodes being subordinate to the top node; and
confirming an effectiveness of the right-to-use the content by the time security list management module comprising:
determining a second current time related to the content,
determining an actual current time as a sum of the stored time change and the second current time, and
comparing the effective time to the actual current time,
wherein when new content and corresponding right information are added, a new top node higher than a current top node is generated by the time security list management module and becomes the top node in the tree structure, and
at least one of the time security module and the time security list management module is embodied in a computer.

14. The method as claimed in claim 13, wherein the setting the effective time comprises:
offsetting the effective time to compensate for the stored change time related to the content.

15. The method as claimed in claim 14, wherein the confirming the effectiveness further comprises:
confirming the effectiveness of the right-to-use the content if the effective time is greater than the actual current time.

* * * * *